United States Patent [19]

Zucker et al.

[11] Patent Number: 5,229,902
[45] Date of Patent: Jul. 20, 1993

[54] CIRCUITRY FOR REVERSING A MAGNETIC FIELD

[75] Inventors: Friedhelm Zucker, Mönchweiler; Christian Büchler, VS-Marbach, both of Fed. Rep. of Germany

[73] Assignee: Deutsche Thomson-Brandt GmbH, Villingen-Schwenningen, Fed. Rep. of Germany

[21] Appl. No.: 424,715

[22] Filed: Oct. 20, 1989

[30] Foreign Application Priority Data

Oct. 22, 1988 [DE] Fed. Rep. of Germany ....... 3836125

[51] Int. Cl.⁵ .................... G11B 5/127; G11B 5/02; G11B 11/00; H01H 47/00
[52] U.S. Cl. ...................................... 360/114; 360/59; 369/13; 361/143; 361/152
[58] Field of Search ................... 360/59, 114; 369/13; 361/143, 149, 152, 154

[56] References Cited

U.S. PATENT DOCUMENTS

| | | | |
|---|---|---|---|
| 4,750,159 | 6/1988 | Yoda | 369/13 |
| 4,926,403 | 5/1990 | Tsuyuguchi et al. | 369/13 |
| 4,937,802 | 6/1990 | Omori et al. | 369/13 |
| 4,996,677 | 2/1991 | Naito et al. | 369/14 |

Primary Examiner—Stuart S. Levy
Assistant Examiner—Jefferson Evans
Attorney, Agent, or Firm—Max Fogiel

[57] ABSTRACT

A circuit for reversing a magnetic field in which a bifilar coil is provided with a series of two oppositely-wound windings that are connected together at one end to form a junction. A source of current is connected in series with an inductive resistor, and this series circuit is connected at one end to the junction. At the other end of this series circuit, there is a voltage supply source. Each of the two oppositely-wound windings has its other end connected to a variable switch. The two variable switches have control inputs that are connected to two outputs from a control unit which applies a reference potential to each winding through the variable switch, so that all current from the source of current flows through each winding upon closure of the respective variable switch.

6 Claims, 1 Drawing Sheet

CIRCUITRY FOR REVERSING A MAGNETIC FIELD

BACKGROUND OF THE INVENTION

The invention concerns circuitry for reversing a magnetic field.

Circuitry of this type is employed for example in magneto-optical recording and playback equipment to reverse the magnetism of the magnetic layer in magneto-optical software.

An example of known magneto-optical software is the magneto-optical disk, which has a magneto-optical layer beyond a light-permeable layer. Information can be entered into and recalled from the magneto-optical layer. How data are entered into a magneto-optical disk will now be described.

A laser beam is focused on the disk and heats the magneto-optical layer to a temperature in the vicinity of its Curie point. It is, however, usually sufficient to heat the layer only to approximately its compensation temperature, which is below the Curie temperature. An electromagnet is positioned beyond the focal point on the disk and magnetizes the area heated by the laser beam in one direction or the other. Since the heated area cools down to below the compensation temperature again once the laser beam is turned off, the magnetic orientation established by the electromagnet is retained. It freezes in, so to speak. The individual bits are accordingly stored in domains of different magnetic orientation. One orientation corresponds for example to a domain of logical ONE and the other to a domain of logical ZERO.

The Kerr effect is exploited to recall the information. The plane of polarization of a linearly polarized beam of light is rotated while being reflected in a magnetized mirror around a measurable angle. The plane of polarization of the reflected beam of light is rotated right or left in accordance with the magnetic orientation of the mirror. Since, however, the individual domains on the disk act like magnetized mirrors, the plane of polarization of a beam of light that scans the domains will be rotated right or left around a measurable angle in accordance with the magnetic orientation of the domain just scanned.

From the angle of rotation of the plane of polarization of the beam of light reflected from the disk, an optical pick-up can determine whether the bit that is present is a ONE or a ZERO.

One known way of magnetizing a magneto-optical layer in one direction or the other is provided by circuitry that acts like an electromagnet with a coil beyond the magneto-optical disk. The coil must be large enough to allow remagnetization of the total area covered by the optical pick-up. This area will, depending on the type of recording-and-playback equipment, be either a radial or circular-segmental strip extending from the edge to the center of the disk. Since the field strength must attain a minimum over the total strip in order for the strip to be remagnetized, the cross-section of the coil will be relatively extensive and its inductivity accordingly relatively high.

The coil in another known approach is secured to the optical pick-up. The coil can for example be wound around the pick-up's objective lens. Since the coil in this version can be advanced along with the optical pick-up along the data tracks on the surface of the magneto-optical disk by a tracking circuit, a less extensive cross-section and accordingly lower inductivity will suffice to generate the same minimum field strength, because it is no longer a radial or circular-segmental strip but only a small and circular for example area with the almost dimensionless laser spot at its center that needs to be remagnetized in the magneto-optical layer.

SUMMARY OF THE INVENTION

The object of the invention is accordingly to provide circuitry that includes a coil and that will ensure rapid reversal of the magnetic field.

This object is attained in accordance with the invention in that the coil is constructed of a series of two windings of opposite pitch, in that the junction between the two windings obtains supply voltage by way of an inductive resistor in series with a source of current, in that the free terminal of one winding obtains reference potential by way of a variable switch and the free terminal of the other winding obtains reference potential by way of another variable switch, and in that the control input terminal of the first variable switch is connected to one output terminal and the control input terminal of the second variable switch is connected to the second output terminal of a control circuit.

BRIEF DESCRIPTION OF THE DRAWING

The invention and how it operates will now be described with reference to the embodiment illustrated in the figure which is an electrical schematic diagram and shows the essential elements, according to the present invention.

DESCRIPTION OF THE PREFERRED EMBODIMENTS

Figure 1:
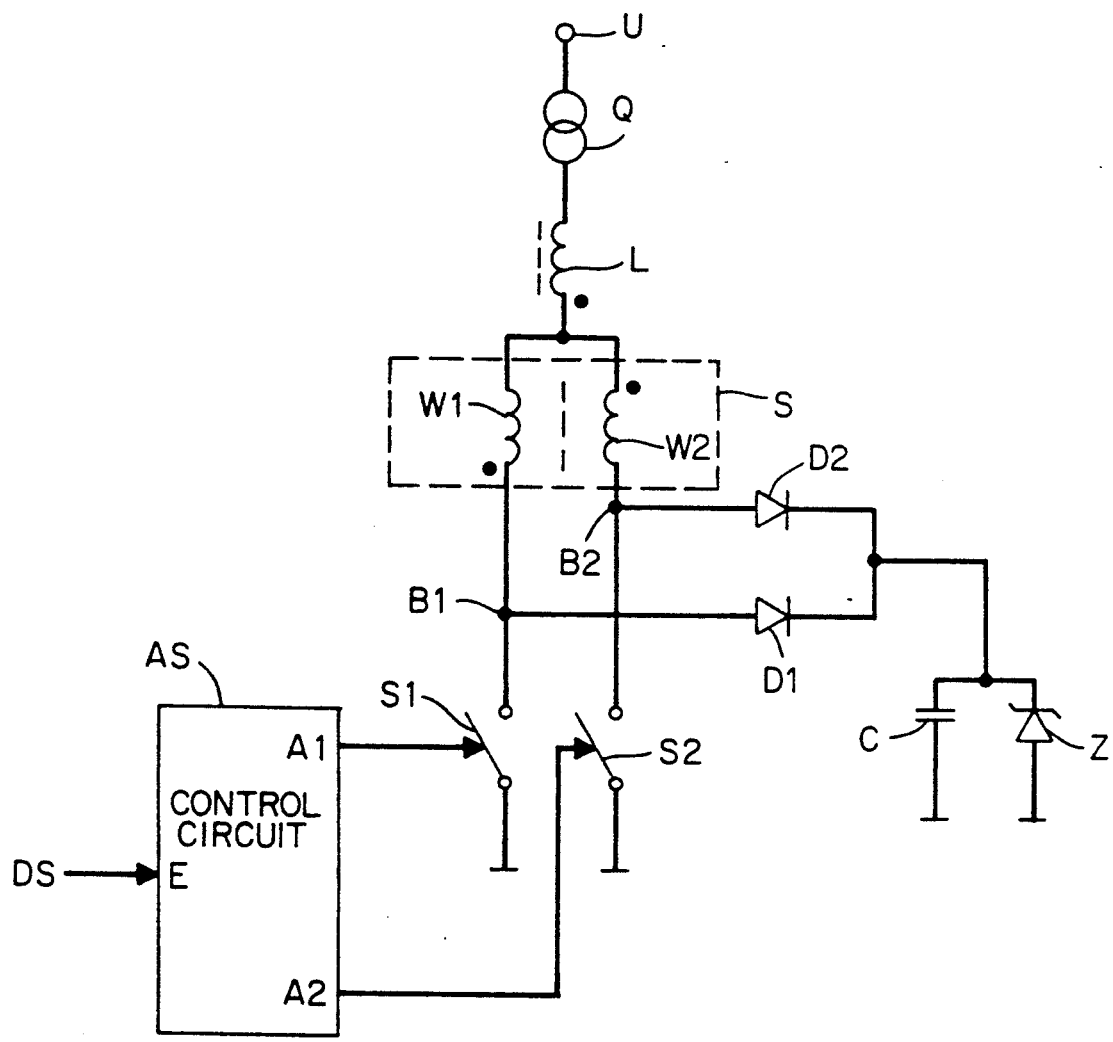

A bifilar coil S comprises a series of two oppositely wound windings W1 and W2. The junction between windings W1 and W2 is supplied with a voltage U by way of an inductive resistor L in series with a source Q of current. The free terminal B1 of winding W1 is connected to reference potential by way of a variable switch S1. The control input terminal of switch S1 is connected to one output terminal A1 of a control circuit AS. The free terminal B2 of winding W2 is also connected to reference potential by way of another variable switch S2, and the control input terminal of switch S2 is connected to the second output terminal A2 of control circuit AS. The free terminal B1 of winding W1 is also connected to reference potential by way of a diode D1 and of a parallel circuit in series with the diode and comprising a capacitor C and a Zener diode Z. The free terminal B2 of winding W2 is connected by way of another diode D2 to the junction between first diode D1 and the parallel circuit that comprises capacitor C and Zener diode Z. The data signal DS that is to be entered is forwarded to the input terminal E of control circuit AS.

In the playback mode, variable switches S1 and S2 are both open. When, however, data are being entered into the magneto-optical disk, either first variable switch S1 or second variable switch S2 is closed by control circuit AS, depending on whether it is a logical ONE or a logical ZERO that is to be stored on the disk.

If for example it is a logical ONE that is to be entered, control circuit AS closes first variable switch S1. Current now flows toward reference potential from source Q of current by way of inductive resistor L, winding W1, and first variable switch S1 but not toward reference potential by way of diodes D1 and D2, which are poled along the blocking direction. When a logical ZERO is to be entered, control circuit AS opens first variable switch S1 and simultaneously closes second variable switch S2. Since current can now flow toward reference potential through winding W2 with switch S2 closed, the orientation of the magnetic field generated by coil S will be reversed.

Due to the self induction of windings W1 and W2, however, the current flowing through them will change only slowly when variable switches S1 and S2 are triggered in opposite phases. At the instant the switches are triggered, accordingly, and the current is supposed to flow from one winding W1 or W2 into the other winding W2 or W1, inductive resistor L will maintain the current almost constant, so that the current will rapidly decrease to zero in one winding and increase to a limit in the other. The reference voltage is rapid reversal of the magnetic field.

Tests have demonstrated that current can be rapidly alternated between one coil and another when the inductivity of coil N is approximately 5 to 50 times as high as that in windings W1 and W2.

The powerful induced voltage that occurs at winding W1 when first variable switch S1 is opened is limited to a prescribed level by first diode D1 and by the parallel circuit consisting of capacitor C and Zener diode Z.

If control circuit AS closes first variable switch S1 again while simultaneously opening second variable switch S2, the induced voltage that occurs at winding W2 during this procedure will also be limited to the prescribed level by second diode D2 and by the parallel circuit consisting of capacitor C and of Zener diode Z.

The advantage of the invention in relation to magneto-optical recording and playback equipment is that data can be directly recorded over other data already on the disk.

With known types of equipment on the other hand the original data must be erased before new data can be recorded. The laser accordingly heats the sites on the magneto-optical layer where new data are to be stored to compensation temperature, magnetizing them in one direction. The disk is then "initialized," in the terminology of the art, and the orientation of the magnetic field generated in the coil is reversed.

To record the new data, the laser output is switched back and forth between a low and a high level depending on the bit that is to be stored. If for example a ZERO is to be stored in the previously erased site, the laser will operate at a low output, and the compensation temperature will not be attained. When a ONE is to be stored on the other hand, the laser will heat the site to compensation temperature, allowing the coil to remagnetize it. Data are initially erased from the magneto-optical disk by this complicated procedure before new data can be recorded on it.

The invention is appropriate for other magnet recording equipment in addition to magneto-optical equipment.

We claim:

1. A circuit for reversing a magnetic field comprising: a bifilar coil having a series of two oppositely wound windings connected together at corresponding first ends to form a junction; an inductive resistor connected to said first junction; a source of current connected in series with said inductive resistor; a voltage supply source connected in series with said inductive resistor and said source of current; a first one of said two oppositely wound windings having a second end connected to a first variable switch; a second one of said windings having a second end connected to a second variable switch; each of said variable switches having a control input; and control means having two outputs, each output being connected to one of said control inputs for applying a reference potential to each winding through said variable switch, all current from said source of current flowing through each said winding upon closure of the respective variable switch connected to said winding, so that said current has a predetermined definite quantity.

2. A circuit as defined in claim 1, wherein said control means alternately opens and closes said two variable switches depending on a bit being stored for reversing magnetization of a magnetic layer in a magnetic storage medium when digital data are recorded.

3. A circuit as defined in claim 2, wherein said magnetic storage medium comprises a magneto-optical disk.

4. A circuit as defined in claim 1, wherein said windings have inductance, said inductive resistor having an inductance higher than the inductance of said windings.

5. A circuit for reversing a magnetic field comprising: a bifilar coil having a series of two oppositely wound windings connected together at corresponding first ends to form a junction; an inductive resistor connected to said first junction; a source of current connected in series with said inductive resistor; a voltage supply source connected in series with said inductive resistor and said source of current; a first one of said two oppositely wound windings having a second end connected to a first variable switch; a second one of said windings having a second end connected to a second variable switch; each of said variable switches having a control input; and control means having two outputs, each output being connected to one of said control inputs for applying a reference potential to each winding through said variable switch, all current from said source of current flowing through each said winding upon closure of the respective variable switch connected to said winding, so that said current has a predetermined definite quantity; a parallel circuit comprising a capacitor connected in parallel with a Zener diode; a first diode connected between the second end of said first winding and said parallel circuit; a second diode connected between the second end of said second winding and said parallel circuit; said control means opening and closing alternately said two variable switches depending on a bit being stored for reversing magnetization of a magnetic layer in a magnetic storage medium when digital data are recorded; said magnetic storage medium being a magneto-optical disk; said windings having inductance, said inductive resistor having an inductance higher than the inductance of said windings.

6. A circuit for reversing a magnetic field comprising: a bifilar coil having a series of two oppositely wound windings connected together at corresponding first ends to form a junction; an inductive resistor connected to said first junction; a source of current connected in series with said inductive resistor; a voltage supply source connected in series with said inductive resistor and said source of current; a first one of said two oppositely wound windings having a second end connected to a first variable switch; a second one of said windings having a second end connected to a second variable switch; each of said variable switches having a control input; and control means having two outputs, each output being connected to one of said control inputs for applying a reference potential to each winding through said variable switch, all current from said source of current flowing through each said winding upon closure of the respective variable switch connected to said winding, so that said current has a predetermined definite quantity; a parallel circuit of a capacitor connected in parallel with a Zener diode; a first diode connected between the second end of said first winding and said parallel circuit; and a second diode connected between the second end of said second winding and said parallel circuit.

* * * * *